Sept. 4, 1956 R. F. SHEPARDSON 2,762,004
REVERSIBLE ELECTRIC MOTOR FOR A FOOD WASTE DISPOSER
Filed Sept. 28, 1953
FIG. 1.
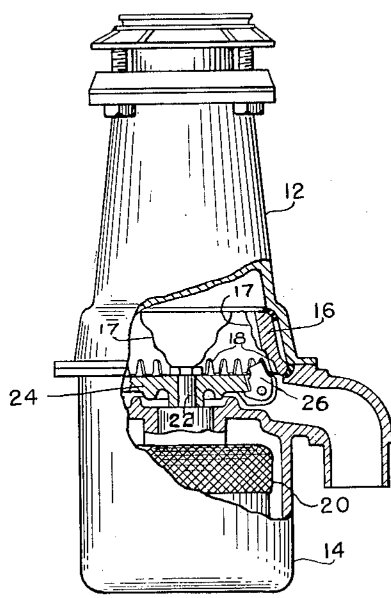
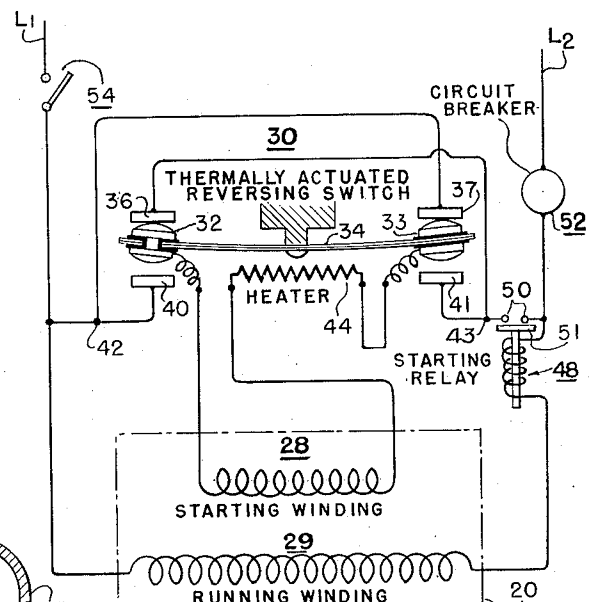
FIG. 2.
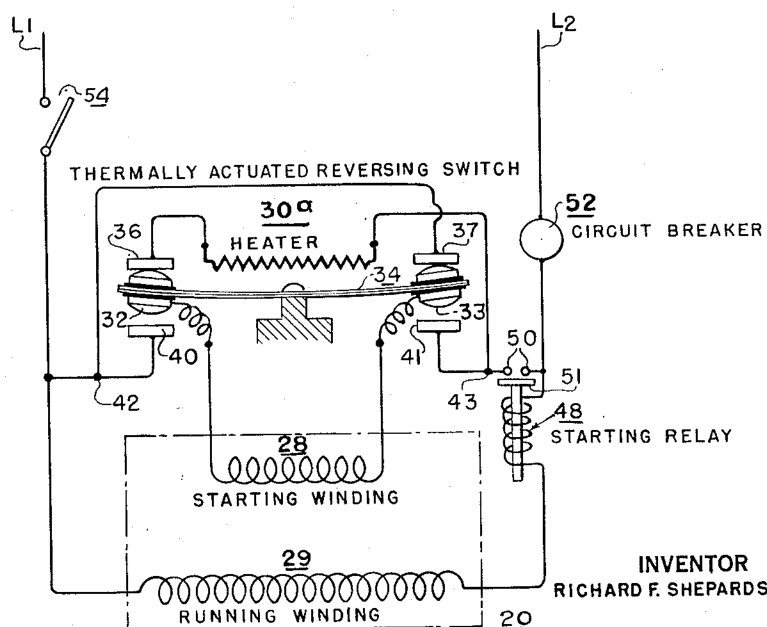
FIG. 3.
INVENTOR
RICHARD F. SHEPARDSON
BY R. J. Eisinger
ATTORNEY United States Patent Office 2,762,004 Patented Sept. 4, 1956

1

2,762,004

REVERSIBLE ELECTRIC MOTOR FOR A FOOD WASTE DISPOSER

Richard F. Shepardson, Springfield, Mass., assignor to Westinghouse Electric Corporation, East Pittsburgh, Pa., a corporation of Pennsylvania Application September 28, 1953, Serial No. 382,537

7 Claims. (Cl. 318—207)

This invention relates to an automatic reversing switch for a reversible electric motor, more particularly to an automatic reversing switch for a reversible motor incorporated in a device for grinding material, such as a food waste disposer.

It is an object of the invention to provide an automatic reversing switch for reversing the motor when the motor becomes jammed, so that it may free itself by rotating in the opposite direction.

It is a further object of the invention to provide an automatic reversing switch which is of simple construction and inexpensive to manufacture.

Some food waste disposers, currently available commercially, are provided with a reversible motor and a switch which is manually operable by the operator to reverse the direction of operation of the motor, so that should the rotary cutters operated by the motor become jammed during the comminution of hard materials, the motor may be reversed and thereby free itself. Food waste disposers of this type are generally protected by an overload protective device, so that, in the event that the motor does become jammed, the power supply to the motor is interrupted within a short time, unless prior thereto the motor is freed by actuating the manually operated reversing switch to energize the motor to rotate in the opposite direction. Such an arrangement entails supervision by the operator to forestall such possibility of interruption of the power supply in the event of jamming by reversing the motor promptly, so that it may continue in the operation of grinding and disposing of food waste and the like.

In accordance with my invention, I provide a reversing switch for reversing the direction of rotation of a reversible motor, for example, a single phase alternating current motor having a starting winding and a running winding. The reversing switch is arranged to reverse the connections of one of the windings, preferably the starting winding, in relation to the other winding, thereby to reverse the direction in which the motor is energized to rotate. The reversing switch comprises a bimetallic member, preferably of the snap-acting type, and a heater for heating the same to cause snap action thereof after a predetermined period of heating. The heater is controlled by the starting relay or switch of the starting winding, so that energization thereof is initiated concurrently with energization of the starting winding. The reversing switch is designed to effect reversal after a predetermined period of time which is greater than the time normally required for the motor to start, at which time the starting relay or switch deenergizes both the starting winding and the heater, so that reversing does not take place if the motor starts normally. However, if the rotor of the motor is stalled, the heater continues to heat the bimetal member until, at the end of the predetermined period, the bimetal member reverses the direction of energization of the motor. This usually frees the motor and operation in the reverse direction is effected. The starting relay or switch then deenergizes both the starting winding and the heater, and the motor continues operation in the reverse direction on the running winding alone.

2

In one embodiment, the heater is connected in series with the starting winding so that in the event that the motor becomes jammed, the motor is reversed once, and should this reversal be insufficient to free the motor, the protective device will then be actuated to open the circuit.

In a second embodiment, the heater is connected in such a manner that it is energized only when the bimetallic member is in the normal or unheated position, so that during stalling it is actuated to heat the bimetallic member and cause it to snap in the opposite direction to reverse the direction of rotation of the motor. When the bimetallic member is in the heated position, the heater is deenergized. Consequently, even though the motor is still stalled, the bimetallic member is allowed to cool, whereupon it returns to its original position to cause operation of the motor in the first direction. Should the stall persist, the heater will again actuate the bimetallic member. With this arrangement, the direction of rotation of the motor is reversed indefinitely, until the protective device is actuated to interrupt the power supply.

The above and other objects are effected by the invention as will be apparent from the following description taken in connection with the accompanying drawings, forming a part of this application, in which:

Fig. 1 is a side elevation of a food waste disposer of the type to which my invention pertains;

Fig. 2 is a schematic diagram showing my thermally actuated reversing switch and its connections to the reversible motor; and Fig. 3 is a schematic diagram showing a second embodiment of my thermally actuated reversing switch and its connections to the reversible motor.

Referring to the drawings in detail, especially Fig. 1, I show a food waste disposer of the type which is adapted to be suspended from a kitchen sink and connected to the waste outlet thereof, as well understood in the art. The disposer is provided with an upper generally frustoconical housing 12 and a lower housing 14 attached to each other. The upper housing 12 is open at both its upper and lower ends and is provided at its lower end with a stationary annular shredding member 16 provided with shredding edges 17 and an annular series of strainer slots 18. An electric motor 20 of the reversible type is housed in the lower housing 14 with its output shaft 22 extending upwardly in substantially vertical direction. A flywheel 24 is mounted on the motor shaft 22 for rotatable operation therewith. The flywheel 24 is provided with one or more impellers 26 mounted adjacent its outer periphery and projecting above its top surface. When the flywheel 24 is rotated by the motor 20, the impellers rotate the material on the flywheel, causing it to move radially outwardly by centrifugal action into engagement with the shredding edges 17, as well understood in the art.

Briefly, the food waste disposer 10 operates in the following manner. Waste is dropped into the upper housing 12 through the upper opening therein and falls upon the flywheel 24. Water is then admitted into the housing 12 and the motor 20 is energized, whereupon the flywheel 24 is rotated, causing the impellers 26 to impel the food around the inner confines of the shredding member 16, whereupon the waste is shredded or otherwise comminuted and subsequently passes out as a soft sludge, together with the water, through a waste outlet 27. The strainer slots 18 serve to permit disposal of comminuted waste but prevent large particles from passing therethrough which might otherwise clog the waste outlet 27.

During comminution of hard waste material, the impellers 26 may become jammed, causing the motor 20 to stall. By running the motor in the opposite direction, the jamming may be released and comminution of waste may thereupon be continued.

In Fig. 2 I show a control system for automatically reversing the motor 20 when it becomes stalled. The motor 20 may be of any suitable reversible type, for example, a single phase alternating current induction motor having a starting winding 28 and a running winding 29. Suitable means (not shown), such as a capacitor, is provided for changing the phase relation of the two windings.

The control system comprises a thermally actuated reversing switch 30 for reversing the connections of the starting winding 28 with respect to the running winding 29, when the starting winding is energized longer than a normal period of time. The reversing switch 30 is provided with a pair of terminals 42 and 43 adapted to be connected to the conductors $L_1$ and $L_2$ of the electrical supply line. The reversing switch 30 includes a bimetallic member 34 of the snap acting type, for example, a bimetallic disc, on which there are insulatedly mounted a pair of double-ended, movable, circuit-reversing contacts 32 and 33. When the bimetallic member 34 is at normal or relatively cool temperature, it is in the upper position, in which position the contacts 32 and 33 engage respectively stationary contacts 36 and 37 that are connected to terminals 43 and 42, respectively. When the bimetallic member 34 becomes heated it snaps downwardly, moving the contacts 32 and 33 into engagement with stationary contacts 40 and 41, which are connected to the terminals 42 and 43, respectively. A small heater 44, which may be of the radiant type, is disposed adjacent the bimetallic member 34 and when energized for a sufficient period of time, serves to heat the bimetallic member 34 to its snap-over temperature, as will subsequently be described. This period of time is greater than the time normally taken for the motor to come up to speed. The heater 44 has one end connected to movable contact 33 through a flexible pigtail conductor. The other end of the heater is connected in series with the starting winding 28 of the motor 20, which in turn is connected to movable contact 32 through a pigtail conductor.

The running winding 29 of the motor is connected to line $L_1$, $L_2$ in parallel with the terminals 42 and 43, respectively, of the reversing switch, through the winding of a conventional starting relay 48. The starting winding serves to connect the starting winding to the line during starting or stalling and to open-circuit the starting winding when the motor attains normal running speed, so that the motor then runs on the running winding alone.

The starting relay is provided with a pair of contacts 50, in series with switch terminal 43, adapted to be bridged by a bridging contact 51 when the current through the relay winding is high.

A circuit breaker 52 may also be connected between the starting relay 48 and the line conductor $L_2$ to protect the motor against damage when overloaded. The circuit breaker 52 may be of the thermally actuated type, responsive to the heating effect of the line current, to disconnect the motor 20 from the power supply line when an abnormally high current condition persists for a longer time than the motor can safely endure.

The starting relay 48 and the circuit breaker 52 may be of any desired types and need not be explained further, since their functions are well known in the art.

Also, a manually operated on-off switch 54 may be connected between the conductor $L_1$ and the motor for initiating or terminating the operation of the food waste disposer.

*Operation—Embodiment shown in Fig. 2*

To initiate operation of the disposer, the on-off switch 54 is closed, causing current to flow through the running winding 29, the winding of the starting relay 48 and the circuit breaker 52. Since, upon starting, current drawn by the running winding is abnormally high, the relay bridging contact 51 is moved upwardly to bridge the contacts 50, thereby connecting the starting winding 28 across line $L_1$, $L_2$ in one polarity relation with running winding 29 and initiating rotation of the motor in one direction. This circuit may be traced as follows: line conductor $L_1$, switch 54, terminal 42, stationary contact 37, movable contact 33, heater 44, starting winding 28, movable contact 32, stationary contact 36, terminal 43, relay contacts 50 and 51, circuit breaker 52, and $L_2$. The interval of time between energization of the starting winding and the attainment of full speed of the motor 20 is normally relatively short, so that before reversal can take place, the current through the running winding drops to a normal level and the relay contacts 50 and 51 are disengaged, thereby interrupting the circuit through the starting winding and permitting the motor to operate on the running winding alone. The heater 44, although energized during the starting operation of the motor, is energized for such a small period of time that its heating effect upon the bimetallic member 34 is insufficient to actuate the bimetallic member 34 when the motor operates in a normal manner.

Should the motor stall, the current through the running winding is maintained at an abnormally high level, so that the starting relay maintains the circuit through the starting winding. During the predetermined period of time, the heater 44 imparts sufficient heat to the bimetallic member 34 to cause it to snap downwardly to disengage the stationary contacts 36 and 37 and engage contacts 40 and 41, thereby reversing the circuit through the starting winding in relation to the running winding, to energize the motor to operate in the opposite direction.

In this position, the starting winding is connected across $L_1$, $L_2$ by the following circuit through switch 30: terminal 42, contacts 40 and 32, the starting winding 28, heater 44, contacts 33 and 41 to terminal 43. From the above circuit it will be seen that the starting winding is now connected across $L_1$, $L_2$ in the opposite polarity relation to the running winding. Hence, the motor now exerts a torque in the opposite direction and attempts to free the impellers 26 of the jamming matter.

The reversing switch is designed to operate in response to starting current earlier than the circuit breaker 52, thus insuring that the motor is reversed, when jammed. If, after reversing, the impellers are still jammed, the circuit breaker 52 disconnects the motor 20 from the line before it is damaged by overheating.

If successful in freeing the impellers, as soon as the motor attains speed in this (reverse) direction, the current through the running winding 29 again drops to a normal level and the starting relay interrupts the circuit through the starting winding, while the motor subsequently operates on he running winding alone.

After a short interval of time, since the heater 44 is not deenergized, the bimetallic member 34 cools and snaps upwardly to move the movable contacts 32 and 33 into reengagement with the stationary contacts 36 and 37. This has no effect on the motor, since the relay contacts 50, 51 are open but serves to condition the reversing switch 30 for a subsequent cycle of operation mentioned above, namely, first operation in one direction and second, operation in the reverse direction should stalling again occur.

*Embodiment shown in Fig. 3*

In Fig. 3, I show a control system which, although similar in its major aspects to the control system shown in Fig. 2, serves to automatically reverse the motor 20 periodically, even though the rotor is locked against rotation in either direction, until the power supply to the motor is interrupted by the circuit breaker 52.

In the system shown in Fig. 3, the starting winding 28 of the motor is connected directly to the movable reversing contacts 32 and 33 of the reversing switch 30*a*. The heater 44 is connected between one of the upper stationary contacts and one of the switch terminals, for example, between the stationary contact 36 and the switch terminal 43, so that it is energized only when the bimetallic member is in the normal or cool position shown.

*Operation—Embodiment shown in Fig. 3*

As described in connection with the embodiment shown in Fig. 2, to initiate operation of the food waste disposer, the on-off switch 54 is moved to the on position, causing the starting relay 48 to close the circuit through the starting winding 28 which is connected across $L_1$, $L_2$ in one polarity relation to the starting winding 29 for energizing the motor for rotation in one direction. This circuit extends through the contacts 32 and 36 and the heater 44, which is thereby energized. When the motor attains normal running speed, the circuit through the starting winding is opened by the relay 48.

Here again, although the abnormal current upon starting causes the heater 44 to become energized, the time interval for starting is so short that the heating effect of the heater 44 is insufficient to actuate the bimetallic member 34.

However, should the motor stall, the abnormal current through the running winding 29 causes the starting relay to maintain the circuit through the starting winding 28 as long as the high current incident to stalling persists. The heater is thus energized for a longer than normal period and heats the bimetallic member 34 to its snap-over temperature, whereupon the movable contacts 32 and 33 disengage the upper stationary contacts 36 and 37, deenergizing the heater 44 and engaging the lower stationary contacts 40 and 41, to reverse the polarity of the starting winding 28 with respect to the running winding, thereby energizing the motor to rotate in the opposite direction. This circuit is traced as follows: switch terminal 42, contacts 40 and 32, starting winding 28, contacts 33 and 41 to terminal 43. Upon initiation of this circuit, the motor attempts to free itself of the stall. If successful, as soon as running speed is attained, the starting relay open circuits the starting winding and the motor continues to operate on the running winding alone. However, should the rotor be jammed against rotation in either direction so that the stall persists, the starting relay contacts are maintained in engagement by the abnormal current through the running winding. Since the heater 44 is out of the starting winding circuit when the bimetallic member is in the lower position, the bimetalic member 34 cools and snaps upwardly to complete the circuit through the starting winding in the original direction, whereupon the direction of energization of the motor is once again reversed.

It will be noted from the above that, since the heater 44 is energized only when a circuit through the starting winding is completed through the upper contacts 36 and 37, the above reversible cycle of operation of the motor will continue indefinitely until the circuit breaker 52 acts to interrupt the power supply. By properly designing the thermally actuated reversing switch **30*a*, it may be enabled to reverse the direction of energization of the motor 20** a number of times before the power supply is interrupted.

It will now be seen that with my invention, I have provided a reversing switch for a reversible motor which switch is simple in operation, may be made of small size, and manufactured economically.

Although the starting winding is shown in both embodiments as connected to the movable contacts, it will be obvious to those skilled in the art that other arrangements of circuit connections may be provided for reversing the circuit through the starting winding.

While the invention has been shown in several forms, it will be obvious to those skilled in the art that it is not so limited, but is susceptible of various other changes and modifications without departing from the spirit thereof.

What is claimed is:

1. The combination with a reversible electric motor, of a reversing switch comprising contacts adapted to effect circuit connections that reverse the direction in which the motor is energized to rotate, temperature responsive means for actuating said contacts and means for heating said temperature responsive means, said heating means being connected in circuit with said motor so that it is deenergized whenever said motor is deenergized, and means for deenergizing said heating means in response to a condition indicating that the motor is running, said temperature responsive means being operative when heated for a predetermined period of time greater than that normally required for the motor to start to actuate said contacts to reverse the direction in which the motor is energized to rotate.

2. In combination with a reversible electric motor having a pair of electrical windings; a reversing switch for automatically reversing the direction of rotation of said motor, said switch having contacts adapted to reverse the connections of one of said windings relative to the other, a thermostatic member adapted to actuate said contacts, and means for heating said thermostatic member in response to abnormally high electric current through one of said windings, said thermostatic member actuating said switch to reverse said connections upon being heated for a period of time longer than the time normally required for the motor to start.

3. In combination with a reversible electric motor having a starting winding and a running winding, and means for automatically deenergizing said starting winding when said motor attains a given speed; a reversing switch for automatically reversing the direction of rotation of said motor, said switch having a set of contacts for reversing the connections of one of said windings relative to the other, a thermostatic member movable to one position when cool and to another position when heated for actuating said switch, and means for heating said thermostatic member in response to abnormally high electric current through one of said windings, said thermostatic member being movable from said one position to said other position when heated for a longer than normal period of time.

4. In combination with a reversible electric motor having a starting winding and a running winding, and means for automatically open-circuiting said starting winding in response to a condition indicating that said motor is running; a reversing switch for automatically reversing the direction of rotation of said motor, said switch having first and second sets of stationary contacts, a set of movable contacts engageable with said first set of contacts to connect one of said windings in relation to the other to effect rotation in one direction and movable into engagement with said second set of contacts to reverse the connections of said one winding in relation to the other to effect rotation in the other direction, a thermostatic member for maintaining said movable contacts in engagement with said first set of contacts when the member is in a cooled state, means for heating said thermostatic member, said heating means being connected in series with said starting winding and said condition responsive means when said movable contacts are in engagement with said first contacts, said heating means, when energized for a period of time greater than normally required for starting of the motor, causing said bimetal to move said movable contacts into engagement with said second set of contacts to reverse the direction of rotation.

5. In a comminuting device having a housing for receiving material to be comminuted, an electrically operated reversible motor having a starting winding and a running winding, means for automatically deenergizing said starting winding in response to a condition indicating that said motor is running, and a comminuting member arranged to be driven by said motor; the combination with said motor comprising a reversing switch for automatically reversing the direction of rotation of said motor when said comminuting member is jammed, said switch comprising contact means for reversing the circuit through one of said windings relative to the other of said windings, thermostatic means for actuating said contact means, and means controlled by said condition responsive means for heating said thermostatic means when said starting winding is energized, said thermostatic means, when heated for a period of time greater than that normally required for starting, actuating said contacts to effect such reversing.

6. The combination set forth in claim 1 and further including a comminuting device having a rotor driven by said motor and adapted to operate in either direction of rotation.

7. The combination set forth in claim 2 and further including a comminuting device having a rotor driven by said motor and adapted to operate in either direction of rotation.

References Cited in the file of this patent

UNITED STATES PATENTS

| | | |
|---|---|---|
| 1,997,673 | Boothly | Apr. 16, 1935 |
| 2,145,616 | Water | Jan. 31, 1939 |
| 2,255,437 | Pearce | Sept. 9, 1941 |
| 2,279,214 | Veindt | Apr. 7, 1942 |
| 2,280,914 | Johns | Apr. 28, 1942 |
| 2,295,391 | Durdin | Sept. 8, 1942 |
| 2,338,515 | Johns | Jan. 4, 1944 |